United States Patent
Wang et al.

(10) Patent No.: US 10,476,727 B2
(45) Date of Patent: Nov. 12, 2019

(54) METHOD AND DEVICE FOR TRANSMITTING SIGNAL IN COMMUNICATION SYSTEM SUPPORTING MULTI-USER ACCESS

(71) Applicants: Samsung Electronics Co., Ltd., Suwon-si, Gyeonggi-do (KR); KOREA ADVANCED INSTITUTE OF SCIENCE AND TECHNOLOGY, Daejeon (KR)

(72) Inventors: Woo-Wan Wang, Daegu (KR); Hyeon-Cheol Park, Daejeon (KR); Seung-Chan Lim, Jeju-si (KR); Sang-Wook Suh, Yongin-si (KR)

(73) Assignees: Samsung Electronics Co., Ltd., Suwon-si (KR); Korea Advanced Institute Of Science And Technology, Daejeon (KR)

(*) Notice: Subject to any disclaimer, the term of this patent is extended or adjusted under 35 U.S.C. 154(b) by 23 days.

(21) Appl. No.: 15/743,496

(22) PCT Filed: Jul. 27, 2016

(86) PCT No.: PCT/KR2016/008236
§ 371 (c)(1),
(2) Date: Jan. 10, 2018

(87) PCT Pub. No.: WO2017/023011
PCT Pub. Date: Feb. 9, 2017

(65) Prior Publication Data
US 2018/0205591 A1 Jul. 19, 2018

(30) Foreign Application Priority Data
Jul. 31, 2015 (KR) ........................ 10-2015-0109212

(51) Int. Cl.
*H04L 27/34* (2006.01)
*H04L 25/03* (2006.01)
(Continued)

(52) U.S. Cl.
CPC ........ *H04L 27/3411* (2013.01); *H04B 7/0452* (2013.01); *H04B 7/0456* (2013.01);
(Continued)

(58) Field of Classification Search
CPC ... H04L 27/3411; H04L 5/0021; H04L 25/03; H04L 27/34; H04J 13/0003; H04B 7/0452; H04B 7/0456
See application file for complete search history.

(56) References Cited

U.S. PATENT DOCUMENTS

2014/0140360 A1* 5/2014 Nikopour ............... H04J 13/00
370/479
2014/0369434 A1 12/2014 Taherzadehboroujeni et al.
(Continued)

OTHER PUBLICATIONS

Mahmoud Taherzadeh et al., SCMA Codebook Design, Vehicular Technology Conference (VTC Fall), 2014 IEEE 80th, Sep. 14, 2014.
(Continued)

*Primary Examiner* — Thai Nguyen
(74) *Attorney, Agent, or Firm* — Jefferson IP Law, LLP

(57) ABSTRACT

Disclosed is a 5G or pre-5G communication system to be provided so as to support a data transmission rate higher than that of a 4G communication system such as long term evolution (LTE). According to the present disclosure, a method for transmitting a signal in a communication system supporting multi-user access comprises the steps of: transmitting, to a receiving device, information indicating a codebook formed on the basis of at least two signal constellations for sparse code multiple access (SCMA) transmissions; and transmitting signals on the basis of the code-
(Continued)

book, wherein the at least two signal constellations are generated on the basis of energy values of symbols of a pre-given mother signal constellation and sizes of the symbols of the mother signal constellation.

20 Claims, 7 Drawing Sheets

(51) Int. Cl.
*H04B 7/0452* (2017.01)
*H04B 7/0456* (2017.01)
*H04L 5/00* (2006.01)
*H04J 13/00* (2011.01)

(52) U.S. Cl.
CPC ........ *H04J 13/0003* (2013.01); *H04L 5/0021* (2013.01); *H04L 25/03* (2013.01); *H04L 27/34* (2013.01)

(56) References Cited

U.S. PATENT DOCUMENTS

2015/0043540 A1    2/2015  Nikopour et al.
2018/0123855 A1*   5/2018  Yoshizawa .............. H04J 13/16

OTHER PUBLICATIONS

Shunqing Zhang et al., Sparse Code Multiple Access: An Energy Efficient Uplink Approach for 5G Wireless Systems, Global Communications Conference (GLOBECOM), 2014 IEEE, Dec. 8, 2014.

\* cited by examiner

METHOD AND DEVICE FOR TRANSMITTING SIGNAL IN COMMUNICATION SYSTEM SUPPORTING MULTI-USER ACCESS

CROSS-REFERENCE TO RELATED APPLICATION(S)

This application is a U.S. National Stage application under 35 U.S.C. § 371 of an International application filed on Jul. 27, 2016 and assigned application number PCT/KR2016/008236, which claimed the benefit of a Korean patent application filed on Jul. 31, 2015 in the Korean Intellectual Property Office and assigned Serial number 10-2015-0109212, the entire disclosure of which is hereby incorporated by reference.

TECHNICAL FIELD

The present disclosure relates to a method for improving characteristics of a transmission signal in a communication system supporting multiple user accesses and an apparatus for supporting the method.

BACKGROUND ART

To satisfy demands for wireless data traffic having increased since commercialization of $4^{th}$-generation (4G) communication systems, efforts have been made to develop improved $5^{th}$-generation (5G) communication systems or pre-5G communication systems. For this reason, the 5G communication system or the pre-5G communication system is also called a beyond-4G-network communication system or a post-long-term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

The SCMA is a codebook-based non-orthogonal multiple access technology and transmits a symbol corresponding to a multi-dimensional constellation. The SCMA has a lower error rate of a reception side, but a higher peak-to-average power ratio (PAPR) in a transmission side than OFDM.

Several methods have been proposed to reduce the PAPR, representative methods of which are clipping, companding, partial transmit sequence (PTS), selected mapping (SLM), etc. However, these methods have been studied based on orthogonal frequency division multiple access (OFDMA), and in spite of PAPR reduction, system complexity is increased or transmission of additional information is required, causing system load and signal distortion, thus resulting in system performance degradation. Therefore, a need exists for a scheme capable of reducing the PAPR caused due to the SCMA.

DETAILED DESCRIPTION OF THE INVENTION

Technical Problem

The present disclosure proposes a method and apparatus for reducing a PAPR in a communication system using SCMA.

Technical Solution

According to the present disclosure, a method for transmitting a signal in a communication system supporting multi-user access includes transmitting information indicating a codebook configured based on at least two signal constellations for SCMA transmission to a reception apparatus and transmitting signals based on the codebook, in which the at least two signal constellations are generated based on energy values of symbols of a given mother signal constellation and magnitudes of the symbols of the mother signal constellation.

According to the present disclosure, a method for receiving a signal in a communication system supporting multi-user access includes receiving information indicating a codebook configured based on at least two signal constellations for SCMA transmission from a transmission apparatus and receiving signals based on the codebook, in which the at least two signal constellations are generated based on energy values of symbols of a given mother signal constellation and magnitudes of the symbols of the mother signal constellation.

Advantageous Effects

The present disclosure designs a codebook including symbols corresponding to signal constellations satisfying a predetermined PAPR value while maintaining energy of a mother signal constellation based on SCMA, and performs communication using the designed codebook, thereby improving PAPR performance while using existing signal processing.

MODE FOR CARRYING OUT THE INVENTION

Figure 1:
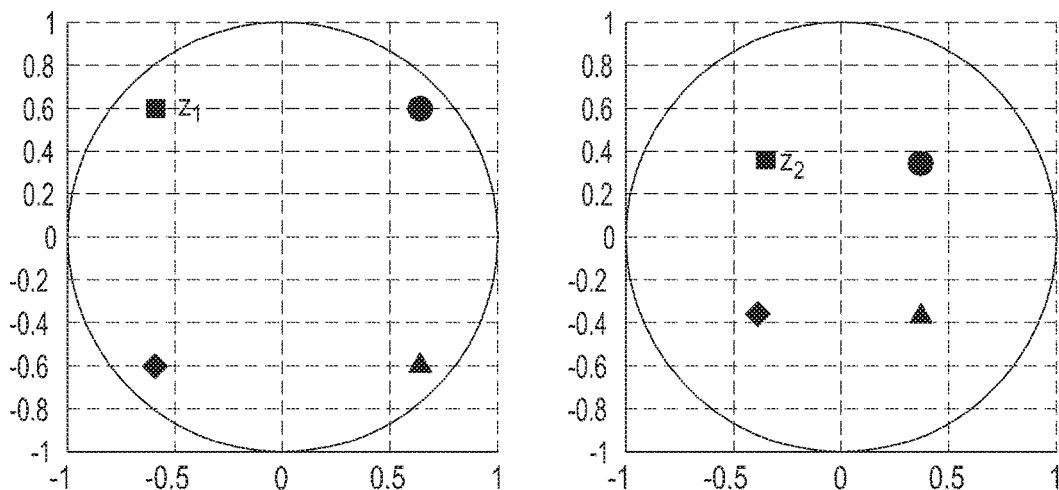
FIG. 1 illustrates an example of a multi-dimensional signal constellation used in general SCMA.

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

The present disclosure relates to a method and apparatus for transmitting a signal in a mobile communication system supporting multiple user accesses.

Sparse code multiple access (SCMA), one of multiple user access techniques, divides a time or a frequency for each user and allocates the time or the frequency to the user, similarly with time division multiple access (TDMA) or frequency division multiple access (FDMA).

Orthogonal frequency division multiple access (OFDMA), one of FDMA techniques, orthogonally divides a frequency band and allocates a frequency to each user, such that theoretically, no interference exists between user signals.

By contrast, SCMA partially shares a time or a frequency, which is a radio resource, such that interference exists due to overlapping between user signals, unlike in OFDMA. As such, since signals of multiple users may overlap in an SCMA-based communication system, a reception side has to detect a signal of each user from the signals of the multiple users, and for this end, for example, a message passing algorithm (MPA) detector may be used.

When SCMA is used, in a communication system, a transmission side transmits a signal by using a codebook based on a multi-dimensional signal constellation.

In a general mobile communication system, a transmission side outputs a modulation symbol generated by modulating a bitstream input to a modulator in signal transmission. For example, assuming a modulator performing M-order modulation, the modulator may receive a bitstream on an M-bit basis and output one of 2M modulation symbols. In this case, the output symbol may be mapped to a pattern including predetermined M bits. Then, the output symbol may correspond to one of 2M points on a single signal constellation. In comparison, assuming that the transmission side uses an N-dimensional signal constellation as a multi-dimensional signal constellation, the modulator performing M-order modulation may receive M bits and output N symbols in the same manner.

FIG. 1 illustrates an example of a multi-dimensional signal constellation used in general SCMA. For convenience, in FIG. 1, four symbols are expressed on a two-dimensional signal constellation. However, the present disclosure may also be extended to a case where a signal constellation of two or more dimensions and other numbers of symbols than 4 are expressed.

Referring to FIG. 1, for example, a pair of points corresponding to an identical shape, i.e., each of ■, ♦, ●, and ▲, on a two-dimensional signal constellation will be referred to as a mother signal constellation symbol. For example, assuming that a mother signal constellation symbol $(z_1, z_2)$ including two points corresponding to ■ is one vector, a sum of magnitudes of components of the vector, L1-norm, may be expressed as $(|z_1|+|z_2|)$.

Figure 2:
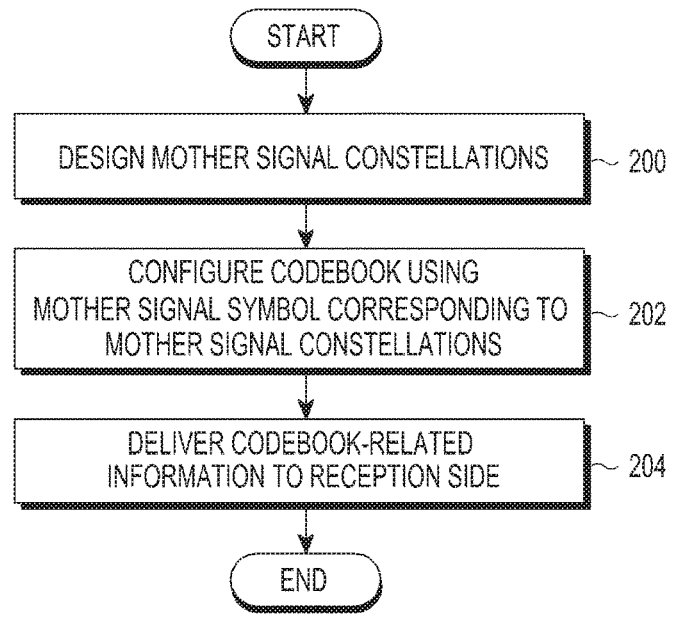
FIG. 2 is a flowchart of transmission operations of a transmission side in a general SCMA-based communication system.

FIG. 2 is a flowchart of transmission operations of a transmission side in a general SCMA-based communication system.

Referring to FIG. 2, it is assumed that a transmission side designs a total of four two-dimensional mother signal constellations as illustrated in FIG. 1 in operation 200. In operation 202, the transmission side configures a set of SCMA codewords, an SCMA codebook that encodes a mother symbol corresponding to each of the designed mother signal constellations and outputs codewords. More specifically, if a modulation order is M and an N-order signal constellation is designed as a mother signal constellation, the transmission side generates an SCMA codeword having a length K (>N). In this case, an SCMA encoder of the transmission side allocates a total of N points selected one by one from N signal constellations after receiving M bits to N of total bits corresponding to the SCMA codeword of the length K, and allocates '0' to the other (K−N) bits. That is, the SCMA codeword is expressed as a row vector having N complex numbers and (K−N) 0s. Unlike in general modulation where one scalar value is output, the SCMA encoder outputs a vector (i.e., the SCMA codeword) of the length K. In this case, to generate a plurality of different signal constellations while maintaining characteristics of a designed mother signal constellation, permutation, phase rotation, and conjugation based on a given mother signal constellation may be used.

In operation 204, the transmission side information indicating the SCMA codebook (hereinafter, referred to as codebook-related information) to the reception side. Thereafter, the transmission side transmits signals generated based on the SCMA codebook to the reception side which then interprets the signals received from the transmission side based on the SCMA codebook.

In the SCMA-based communication system, when existing mother signal constellations are used as shown in FIG. 1, a PAPR of signals transmitted by the transmission side is higher than that of an OFDM signal.

Therefore, an embodiment of the present disclosure proposes a scheme for reducing PAPR characteristics of the transmission side in the SCMA-based communication system. More specifically, a method for designing a mother signal constellation according to an embodiment of the present disclosure defines optimization for PAPR improvement and thus obtains a new mother signal constellation.

To design a mother signal constellation according to an embodiment of the present disclosure, a scaling factor is reflected to modify an optimization problem. The modified optimization problem includes one objective function and one constraint, and by obtaining an optimal objective function and an optimized scaling factor which satisfy the constraint, a new mother signal constellation may be designed. An embodiment of the present disclosure also proposes a relationship between the objective function and the scaling factor, which satisfy the constraint, by modifying the optimization problem.

Hereinbelow, an embodiment of the present disclosure is applicable to, for example, machine-to-machine (M2M) communication of an Internet of Things (IoT) environment.

Figure 3:
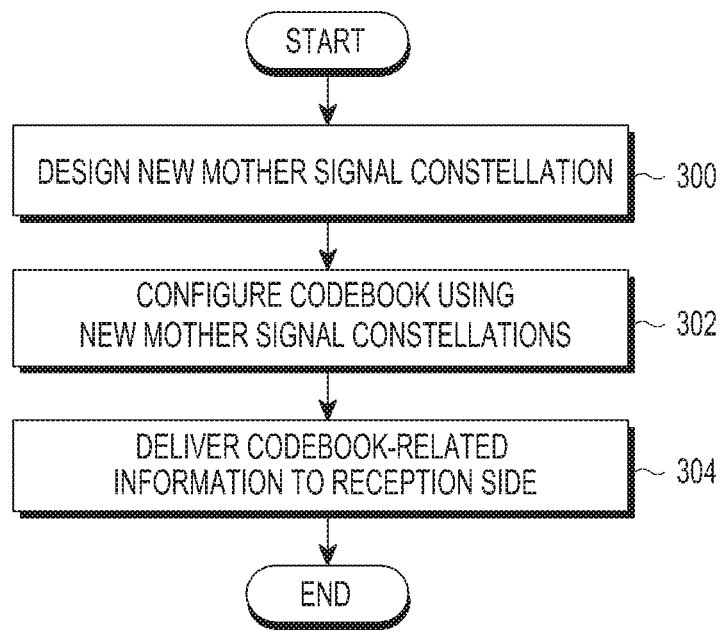
FIG. 3 is a flowchart of operations of a transmission side according to an embodiment of the present disclosure.

FIG. 3 is a flowchart of operations of a transmission side according to an embodiment of the present disclosure.

Referring to FIG. 3, in an embodiment of the present disclosure, a transmission side designs new mother signal constellations for PAPR reduction in operation 300. Assuming a communication system using multiple carriers, if phases of carrier signals match or magnitudes of overlapping carrier signals are high, a high PAPR is generated.

Thus, in an embodiment of the present disclosure, by using the above PAPR characteristics, a new signal constellation is calculated as below. Herein, a new signal constellation symbol $(\tilde{z}_1, \tilde{z}_2)$ is obtained by using an optimization symbol that minimizes an objective function defined by a sum of magnitudes of components, i.e., $L_1$-norm $(\tilde{z}_1, \tilde{z}_2)$, while maintaining energy of the mother signal constellation symbol) $(z_3, z_2)$ of FIG. 1 (hereinafter, referred to as an 'existing mother signal constellation symbol'). Each component indicates a strength of each signal. Thus, magnitudes of overlapping signals may be obtained using the objective function. In an embodiment of the present disclosure, the optimization symbol $(\hat{z}_1, \hat{z}_2)_{opt}$ may be obtained using Equation 1.

$$(\hat{z}_1, \hat{z}_2)_{opt} = \operatorname*{argmin}_{z_1, z_2} |\tilde{z}_1| + |\tilde{z}_2| \qquad \text{[Equation 1]}$$
$$\text{s.t. } |\tilde{z}_1|^2 + |\tilde{z}_2|^2 = 1$$

To obtain a value of the new mother signal constellation $(\tilde{z}_1, \tilde{z}_3)$, a scaling factor $(a \geq 0, b \geq 0)$ is reflected to Equation 1, such that an optimization problem according to an embodiment of the present disclosure may be expressed as Equation 2.

$$(a, b)_{opt} = \operatorname*{argmin}_{a,b} a|z_1| + b|z_2| \qquad \text{[Equation 2]}$$
$$\text{s.t. } a^2|z_1|^2 + b^2|z_2|^2 = 1$$

The scaling factor (a,b) is defined using a relationship equation $(\tilde{z}_1, \tilde{z}_2) = (az_1, bz_2)$ between an existing mother signal constellation $(z_1, z_2)$ and a new mother signal constellation $(\tilde{z}_1, \tilde{z}_2)$. The optimization problem according to an embodiment of the present disclosure may be specified to a problem for obtaining (a,b) that minimizes the objective function while satisfying the constraint based on the scaling factor (a,b).

Figure 4:
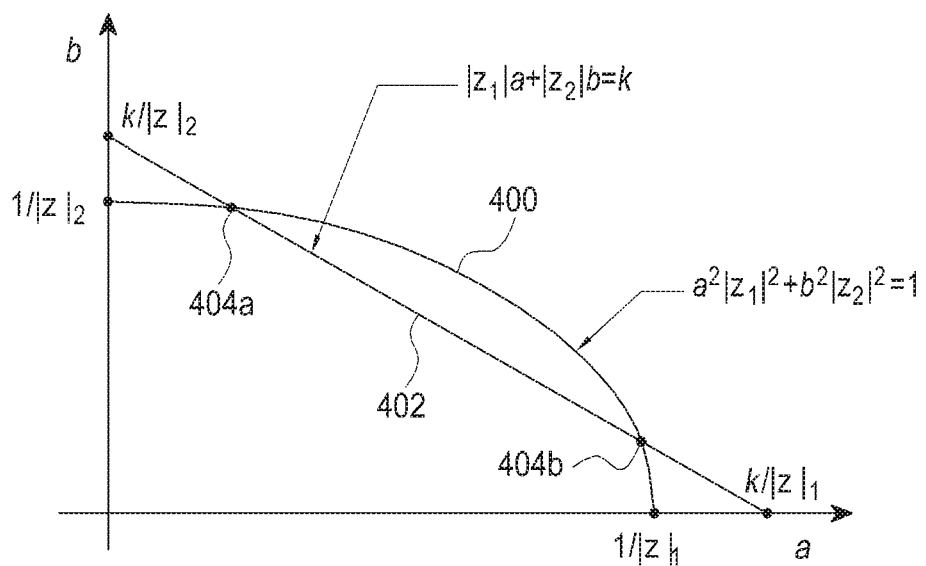
FIG. 4 illustrates an example of an objective function and a constraint function according to an embodiment of the present disclosure.

FIG. 4 illustrates an example of an objective function and a constraint function according to an embodiment of the present disclosure.

Referring to FIG. 4, the objective function and the constraint may be expressed on coordinates corresponding to a variable (a,b). That is, the objective function is expressed with an equation of a straight line 402 corresponding to $a|z_1|+b|z_2|=k$, and the constraint is expressed with an equation of an oval 400 corresponding to $a^2|z_1|^2+b^2|z_2|^2=1$. Herein, an optimization variable $(a,b)_{opt}$ that is an optimization value of the scaling factor may be obtained from a value of a variable (a,b) that makes k have a minimum value between intersections 404a and 404b of the straight line 402 and the oval 400. Thus, in an embodiment of the present disclosure, by changing k, $(a,b)_{opt}$ and $(\hat{z}_1, \hat{z}_2)_{opt}$ mapped to the optimization variable, i.e., an optimized mother symbol may be obtained.

Figure 5:
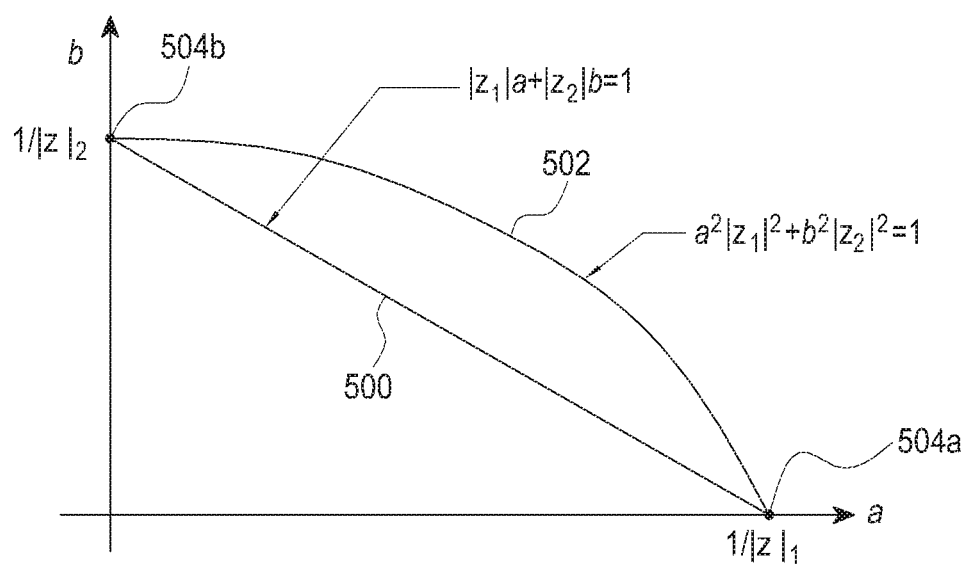
FIG. 5 illustrates an example of optimized objective function and constraint function according to an embodiment of the present disclosure.

FIG. 5 illustrates an example of optimized objective function and constraint function according to an embodiment of the present disclosure.

Referring to FIG. 5, when k is changed in the straight-line equation of FIG. 4 to obtain the optimization variable $(a,b)_{opt}$, if a straight line 500 corresponding to $a|z_1|+b|z_2|=k$ indicated on an a-axis and a b-axis meets an oval 502 corresponding to $a^2|z_1|^2+b^2|z_2|^2=1$ at a long axis and a short axis of the oval 502, i.e., at $(1/|z_1|,0)$ 504a and $(0,1/|z_2|)$ 504b, k has a minimum value and the variable (a,b) corresponds to the optimization variable $(a,b)_{opt}$. The minimum value of k and the optimization variables $(a,b)_{opt}$ and $(\hat{z}_1, \hat{z}_2)_{opt}$ are expressed as Equation 3.

$$k = 1 \qquad \text{[Equation 3]}$$
$$(a, b)_{opt} = \left(\frac{1}{|z_1|}, 0\right) \text{ or } \left(0, \frac{1}{|z_2|}\right)$$
$$(\hat{z}_1, \hat{z}_2)_{opt} = (az_1, bz_2)$$
$$= \left(\frac{z_1}{|z_1|}, 0\right) \text{ or } \left(0, \frac{z_2}{|z_2|}\right)$$

Figure 6:
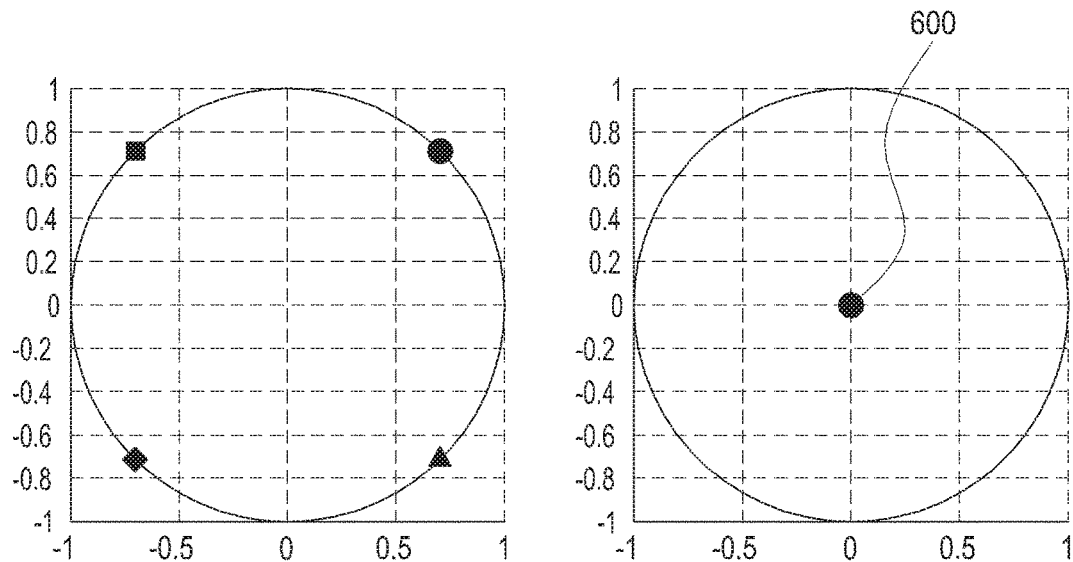
FIG. 6 is an example of optimized mother signal constellations according to the embodiment of FIG. 5.

FIG. 6 is an example of optimized mother signal constellations according to the embodiment of FIG. 5.

Referring to FIG. 6, all points of a signal constellation including $z_2$ among the mother signal constellations of FIG. 1 are moved due to a change of k and overlap at a position of '0' 600. That is, if a minimum value of k is satisfied, new mother signal constellations having the same dimension as that of existing mother signal constellations are difficult to obtain. Thus, the performance of SCMA supporting multi-dimensional mother signal constellations is degraded.

Meanwhile, when the straight-line equation $a|z_1|+b|z_1|=k$ is a tangent of the oval equation $a^2|z_1|^2+b^2|z_2|^2=1$, k has a maximum value. In this case, k, (a,b), and $(\tilde{z}_1,\tilde{z}_2)$ may be expressed as Equation 5.

$$k = \sqrt{2} \qquad \text{[Equation 5]}$$
$$(a, b)_{opt} = \left(\frac{1}{\sqrt{2}\,|z_1|}, \frac{1}{\sqrt{2}\,|z_2|}\right)$$
$$(\hat{z}_1, \hat{z}_2) = (az_1, bz_2)$$
$$= \left(\frac{z_1}{\sqrt{2}\,|z_1|}, \frac{z_2}{\sqrt{2}\,|z_2|}\right)$$

When k has a maximum value, a PAPR of a corresponding mother signal constellation has a maximum value.

Thus, in an embodiment of the present disclosure, to select an optimal k value, which reduces a PARP while reducing degradation of SCMA performance, for an existing mother signal constellation symbol $(z_1,z_2)$, an optimal value of k, $k_0$, has to be determined between the maximum value of k corresponding to the worst PARP performance and the minimum value of k corresponding to the possible SCMA performance degradation in spite of the best PAPR performance. That is, scaling factors (a,b) and $(\tilde{z}_1,\tilde{z}_2)$ satisfying $k=k_0$ ($1 \leq k_0 \leq \sqrt{2}$) may be expressed as Equation 4.

$$(a, b) = \left( \frac{k_0 \pm \sqrt{2-k_0^2}}{2|z_1|}, \frac{k_0 \mp \sqrt{2-k_0^2}}{2|z_2|} \right)$$ [Equation 4]

$$(\tilde{z}_1, \tilde{z}_2) = \left( \frac{k_0 \pm \sqrt{2-k_0^2}}{2|z_1|} z_1, \frac{k_0 \mp \sqrt{2-k_0^2}}{2|z_2|} z_2 \right)$$

Figure 7:
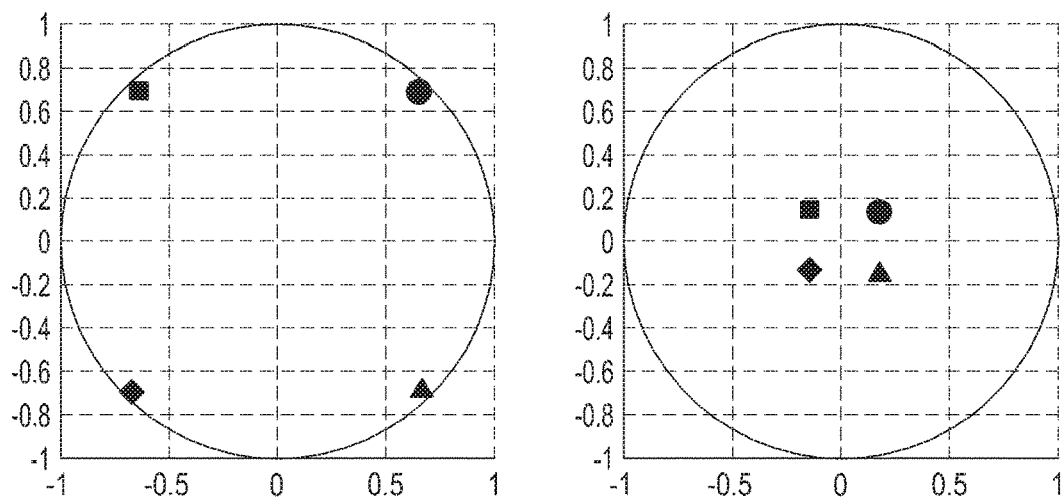
FIG. 7 illustrates an example of a new mother signal constellation for an optimal value of k=1.2 obtained according to an embodiment of the present disclosure.

More specifically, assuming the optimal value of k=1.2 obtained according to an embodiment of the present disclosure, a new mother signal constellation may be expressed as shown in FIG. 7. Referring to FIG. 7, it can be seen that all of point pairs of each of optimized mother signal constellations are expressed as values close to '0'. As a result, a sum of magnitudes of points of each pair becomes small, such that a PAPR of a signal constellation becomes lower.

In operation 302, the transmission side determines optimized mother signal constellations obtained as described above as new mother signal constellations.

According to an embodiment of the present disclosure, the transmission side configures an SCMA codebook including a set of SCMA codewords generated based on the determined new mother signal constellations. In operation 304, the transmission side delivers codebook-related information (e.g., a codebook index) indicating the SCMA codebook to the reception side. Thereafter, as communicating with the reception side based on the SCMA codebook, the transmission side transmits and receives a signal having a reduced PAPR to and from the reception side.

A plurality of SCMA codebooks according to an embodiment of the present disclosure may be used to support multiple users or a plurality of users. In this case, the transmission side may allocate a unique codebook to each user to distinguish the plurality of users. More specifically, if the number of users to be supported by a base station is determined using a new mother signal constellation designed according to an embodiment of the present disclosure, the base station generates unique codebooks corresponding to the number of users through permutation, phase rotation, conjugation, etc., and allocates a codebook to each user, thereby supporting the plurality of users.

Meanwhile, a plurality of user equipments are allocated with codebooks designed according to an embodiment of the present disclosure and then communicate with the base station. In this case, a codebook used by each user is affected by a channel environment. If a channel environment is good in communication between the base station and the user equipment, that is, in case of a high channel gain, the base station and the user equipment may transmit and receive much data at a time at a high data rate by increasing a modulation order. On the other hand, in case of a low channel gain, even if a channel environment is poor, data having high reliability may be transmitted and received in spite of a low data rate due to a lowered modulation order. As a result, since the channel environment may change in communication between the plurality of users and the base station, the base station may allocate a codebook of a proper modulation order to each user equipment according to a channel gain so as to reflect the changing channel environment. In this way, in an embodiment of the present disclosure, the base station and the user equipment may efficiently transmit data by achieving an optimal data rate.

While the transmission side performs both operations 300 and 304 in FIG. 3, they may be performed by separate devices. In other words, a device may configure the codebook and another device may deliver codebook-related information to the reception side using the codebook.

Figure 8:
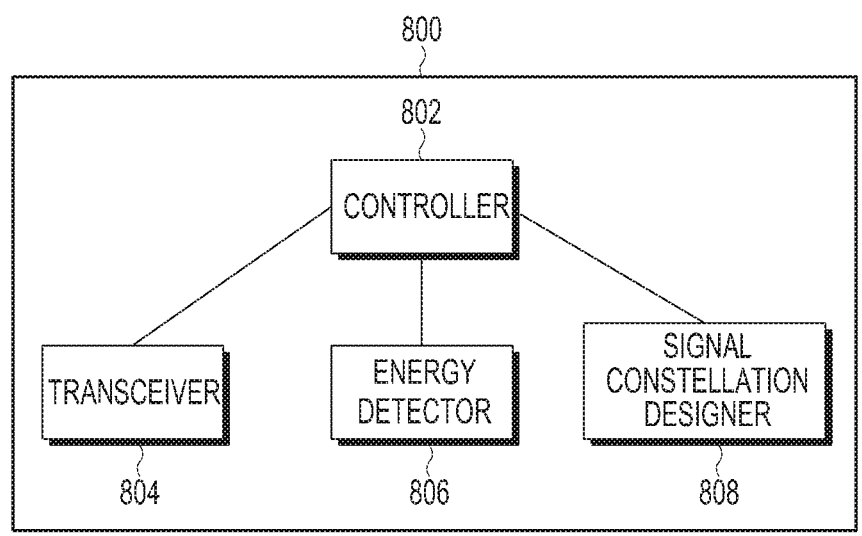
FIG. 8 is a block diagram of a transmission side according to an embodiment of the present disclosure.

FIG. 8 is a block diagram of a transmission side according to an embodiment of the present disclosure.

Referring to FIG. 8, a transmission side 800 may include a controller 802, a transceiver 804, a storage unit 806, and a signal constellation designer 808. The illustrated structure of the transmission side is merely an example, and units may be divided or integrated depending on their functions according to an intention of an operator or an embodiment. The structure of the transmission side may also be implemented by a separate device.

The signal constellation designer 808 obtains new mother signal constellations corresponding to mother signal constellations stored in the storage unit 806 under control of the controller 802. The controller 802 then configures a codebook based on the new mother signal constellations and stores the configured codebook in the storage unit 806. The controller 802 controls the codebook related information to be transmitted to the reception side through the transceiver 804. The transceiver 804 then transmits the codebook related information.

Figure 9A:
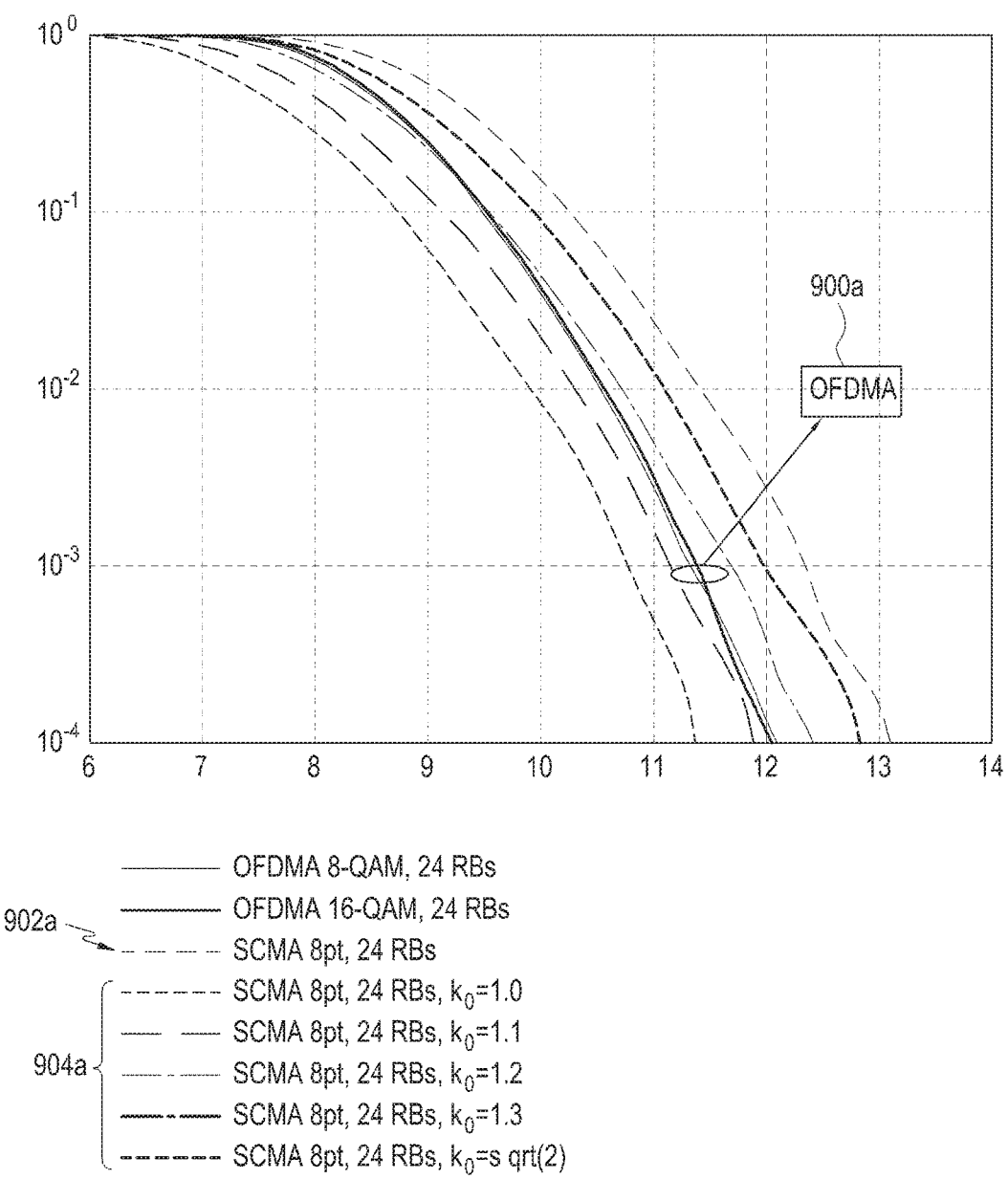
FIGS. 9a and 9b are an example of PAPR performance graphs corresponding to communication using a new mother signal constellation-based SCMA codebook according to an embodiment of the present disclosure.
Figure 9B:
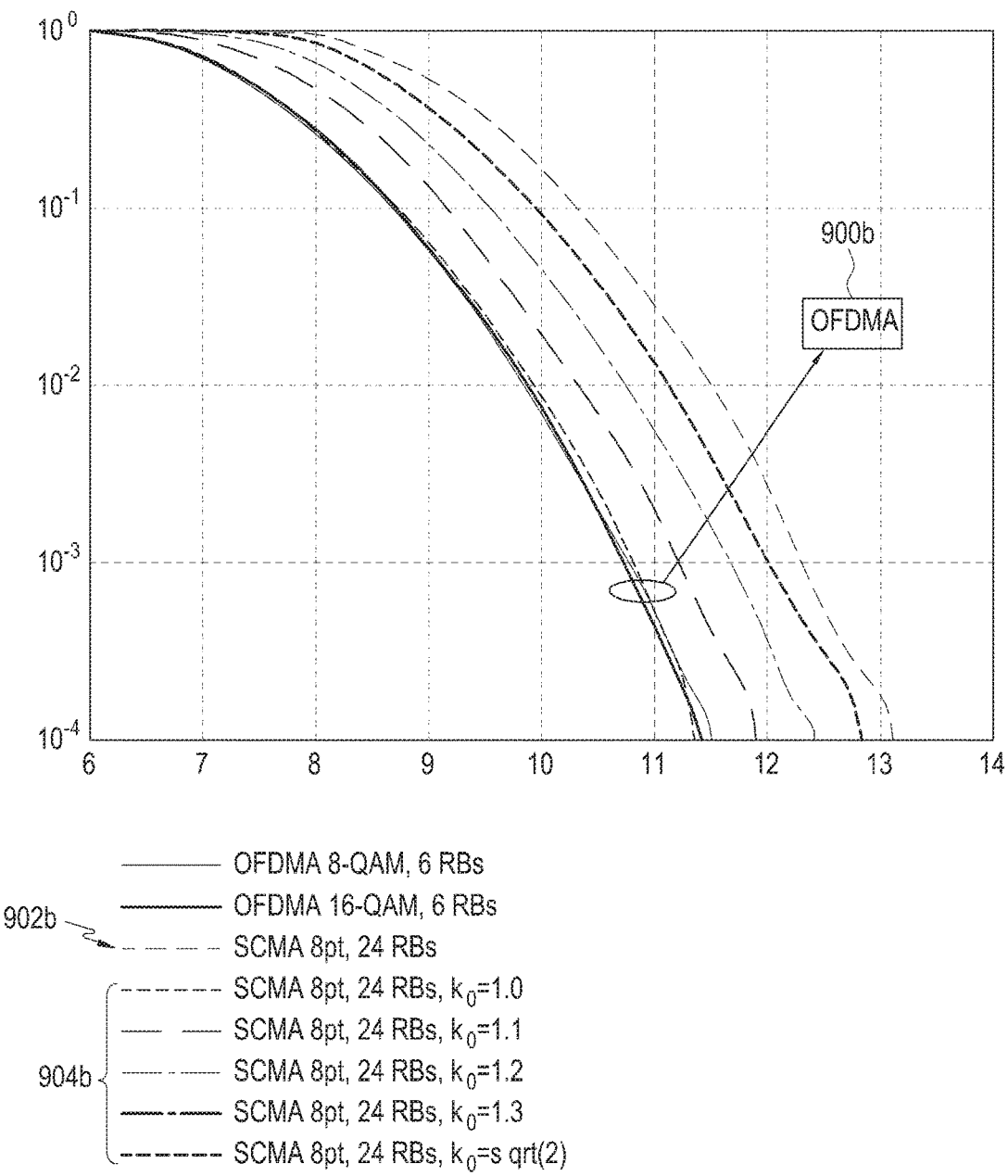

FIGS. 9A and 9B are an example of PAPR performance graphs corresponding to communication using a new mother signal constellation-based SCMA codebook according to an embodiment of the present disclosure. For convenience, it is assumed in FIG. 9A that a resource block (RB) structure of Long Term Evolution (LTE) standards, as an example of mobile communication systems, is used, an OFDM-based SCMA system uses a total of 24 RBs, and OFDMA uses 24 RBs in the same manner. In FIG. 9B it is assumed that in the same environment as FIG. 9A, 6 RBs are used for transmission of the same modulation symbol by OFDMA.

Referring to FIGS. 9A and 9b, when transmission is performed using a general SCMA codebook as indicated by 902a and 902b, PAPR performance is higher than when transmission is performed using OFDMA as indicated by 900a and 900b. On the other hand, when transmission is performed using a SCMA codebook designed according to an embodiment of the present disclosure as indicated by 904a and 904b, PAPR performance is lower than when transmission is performed using the general SCMA codebook as indicated by 902a and 902b. When OFDMA uses 24 RBs, PAPR performance of OFDM-based SCMA may be better than PAPR performance of OFDMA depending on the value $k_0$, and when OFDMA uses six RBs, PAPR performance of OFDMA-based SCMA has a value close to the PAPR performance as indicated by 900a and 900b when k has an optimized value (1.0 in FIGS. 9A and 9B) in view of PAPR minimization.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for transmitting a signal in a communication system supporting multi-user access, the method comprising:

transmitting, by a transmission apparatus, information indicating a codebook configured based on at least two signal constellations for sparse code multiple access (SCMA) transmission to a reception apparatus; and transmitting, by the transmission apparatus, signals based on the codebook to the reception apparatus, wherein the at least two signal constellations are generated by applying a scaling factor to a given mother signal constellation, and wherein the scaling factor is generated based on energy values of symbols of the given mother signal constellation and magnitudes of the symbols of the given mother signal constellation.

2. The method of claim 1, wherein the at least two signal constellations are generated such that an energy value of a first symbol of the given mother signal constellation is equal to a sum of energy values of at least two symbols corresponding to the first symbol, among the at least two signal constellations.

3. The method of claim 2, wherein the at least two signal constellations are generated such that a sum of magnitudes of the at least two symbols corresponding to the first symbol of the given mother signal constellation, among the at least two signal constellations falls within a predetermined range.

4. The method of claim 3, wherein the scaling factor is generated based on the sum of the energy values of the at least two symbols corresponding to the first symbol and the sum of the magnitudes of the at least two symbols corresponding to the first symbol.

5. The method of claim 1, wherein the at least two signal constellations are generated by the transmission apparatus, and wherein the generating of the at least two signal constellations comprises at least one of permutation, phase rotation, or conjugation.

6. The method of claim 1, wherein the scaling factor and the at least two signal constellations are generated by the transmission apparatus, wherein the generating of the scaling factor comprises defining a relationship between the at least two signal constellations and the given mother signal constellation, such that an energy value of a first symbol of the given mother signal constellation is equal to a sum of energy values of at least two symbols corresponding to the first symbol among the at least two signal constellations, and a sum of magnitudes of the at least two symbols corresponding to the first symbol among the at least two signal constellations falls within a predetermined range, and wherein the method further comprises configuring, by the transmission apparatus, the codebook comprising a set of SCMA codewords generated based on the at least two signal constellations.

7. The method of claim 6, further comprising transmitting, by the transmission apparatus, the configured codebook to the reception apparatus.

8. A method for receiving a signal in a communication system supporting multi-user access, the method comprising:

receiving, by a reception apparatus, information indicating a codebook configured based on at least two signal constellations for sparse code multiple access (SCMA) transmission from a transmission apparatus; and receiving, by the reception apparatus, signals based on the codebook from the transmission apparatus, wherein the at least two signal constellations are generated by applying a scaling factor to a given mother signal constellation, and wherein the scaling factor is generated based on energy values of symbols of the given mother signal constellation and magnitudes of the symbols of the given mother signal constellation.

9. The method of claim 8, wherein the at least two signal constellations are generated such that an energy value of a first symbol of the given mother signal constellation is equal to a sum of energy values of at least two symbols corresponding to the first symbol among the at least two signal constellations.

10. The method of claim 9, wherein the at least two signal constellations are generated such that a sum of magnitudes of the at least two symbols corresponding to the first symbol of the given mother signal constellation among the at least two signal constellations falls within a predetermined range.

11. The method of claim 10, wherein the scaling factor is generated based on the sum of the energy values of the at least two symbols corresponding to the first symbol and the sum of the magnitudes of the at least two symbols corresponding to the first symbol.

12. The method of claim 8, wherein the at least two signal constellations are generated by the transmission apparatus, and wherein the generating of the at least two signal constellations comprises at least one of permutation, phase rotation, or conjugation.

13. The method of claim 8, further comprising receiving, by the reception apparatus, the codebook from the transmission apparatus.

14. An apparatus for transmitting a signal in a communication system supporting multi-user access, the apparatus comprising:

a transceiver; and a processor configured to control the transceiver to:

transmit information indicating a codebook configured based on at least two signal constellations for sparse code multiple access (SCMA) transmission to a reception apparatus, and transmit signals based on the codebook to the reception apparatus, wherein the at least two signal constellations are generated by applying a scaling factor to a given mother signal constellation, and wherein the scaling factor is generated based on energy values of symbols of the given mother signal constellation and magnitudes of the symbols of the given mother signal constellation.

15. The apparatus of claim 14, wherein the at least two signal constellations are generated such that an energy value of a first symbol of the given mother signal constellation is equal to a sum of energy values of at least two symbols corresponding to the first symbol, among the at least two signal constellations.

16. The apparatus of claim 15, wherein the at least two signal constellations are generated such that a sum of magnitudes of the at least two symbols corresponding to the first symbol of the given mother signal constellation, among the at least two signal constellations falls within a predetermined range.

17. The apparatus of claim 16, wherein the scaling factor is generated based on the sum of the energy values of the at least two symbols corresponding to the first symbol and the sum of the magnitudes of the at least two symbols corresponding to the first symbol.

18. The apparatus of claim 14, wherein the at least two signal constellations are generated by the processor, and wherein the generating of the at least two signal constellations comprises at least one of permutation, phase rotation, or conjugation.

19. The apparatus of claim 14,
wherein the scaling factor and the at least two signal constellations are generated by the processor,
wherein the generating of the scaling factor comprises defining a relationship between the at least two signal constellations and the given mother signal constellation, such that an energy value of a first symbol of the given mother signal constellation is equal to a sum of energy values of at least two symbols corresponding to the first symbol among the at least two signal constellations, and a sum of magnitudes of the at least two symbols corresponding to the first symbol among the at least two signal constellations falls within a predetermined range; and
wherein the processor is further configured to configure the codebook comprising a set of SCMA codewords generated based on the at least two signal constellations.

20. The apparatus of claim 19, wherein the processor is further configured to control the transceiver to transmit the configured codebook to the reception apparatus.

* * * * *